United States Patent [19]

Bowers, III et al.

[11] Patent Number: 5,530,343
[45] Date of Patent: Jun. 25, 1996

[54] INDUCTION MOTOR SPEED DETERMINATION BY FLUX SPECTRAL ANALYSIS

[75] Inventors: Stewart V. Bowers, III; Kenneth R. Piety, both of Knoxville, Tenn.

[73] Assignee: Computational Systems, Inc., Knoxville, Tenn.

[21] Appl. No.: 320,151

[22] Filed: Oct. 7, 1994

[51] Int. Cl.$^6$ ............................... G01P 3/42; G01P 3/48; G01P 3/54

[52] U.S. Cl. ................. 324/173; 324/160; 324/166; 364/565

[58] Field of Search ....................... 324/160, 166, 324/167, 173, 177, 207.11, 207.15, 207.22, 207.25; 364/565; 318/650, 652, 653

[56] References Cited

U.S. PATENT DOCUMENTS

| | | | |
|---|---|---|---|
| 4,495,448 | 1/1985 | Dumbeck | 318/54 |
| 4,612,620 | 9/1986 | Davis et al. | 364/551 |
| 4,761,703 | 8/1988 | Kliman et al. | 361/23 |
| 5,049,815 | 9/1991 | Kliman | 324/158 |
| 5,252,915 | 10/1993 | Sedding et al. | 324/158 |

OTHER PUBLICATIONS

M. N. Dey, "On-line Protection of Electrical Machines by Microcomputer Analysis of Axial Leakage Flux," Ph.D. Thesis, University of Aberdeen, U.K., 1983.

J. Penman, M. N. Dey, A. J. Tait and W. E. Bryan, "Condition Monitoring of Electrical Drives," IEE Proceedings, vol. 133, Pt. B, No. 3, May 1986.

J. Penman and M. N. Dey, "Multi-Functional Monitoring and Protection Scheme for Electrical Machines," UPEC 19 Universities of Dundee and Aberdeen, U.K.

R. A. Leonard and W. T. Thomson, "Vibration and Stray Flux Monitoring for Unbalanced Supply and Inter-Turn Winding Fault Diagnosis in Induction Motors"; British Journal of NDT, pp. 211-215, Jul. 1986.

W. T. Thomson, R. A. Leonard, A. J. Milne, and J. Penman, "Failure Identification of Offshore Induction Motor Systems Using On-Condition Monitoring", Proceedings of 4th National Reliability Conference, Birmingham, U.K., 1983.

Primary Examiner—Walter E. Snow
Attorney, Agent, or Firm—Luedeka, Neely & Graham

[57] ABSTRACT

Apparatus for determining the rotational speed of an AC induction motor based on a spectrum analysis of a magnetic flux signal. For a Phase I analysis, which is usually sufficient, three sets of families of peaks indicative of possible rotational speeds are defined, and the flux frequency spectrum is searched for peaks meeting the family definitions to determine candidate speeds, and to assign scores. If there is a candidate speed with an overall score which exceeds a predetermined threshold, the motor rotational speed is determined as that candidate speed. A Phase II analysis, employing a more exhaustive set of five additional family definitions, is applied when Phase I fails to reach a result.

17 Claims, 10 Drawing Sheets

INDUCTION MOTOR SPEED DETERMINATION BY FLUX SPECTRAL ANALYSIS

BACKGROUND OF THE INVENTION

The present invention relates generally to AC induction motors and, more particularly, to apparatus for determining the rotational speed of an AC induction motor based on a spectral analysis of a magnetic flux signal.

When applying automated techniques involving spectral analysis of magnetic flux or motor current signals for recognizing induction motor faults, such as broken rotor bars, and for proactively predicting failures due to overheating in time for preventative maintenance action, it is usually necessary to determine, to a high degree of accuracy, the actual rotational speed of a motor. The various analysis approaches require information regarding motor speed, and yet the speed of an AC induction motor varies with load.

Examples of automated fault detection systems which implement spectral analysis for determining rotational speed are disclosed in Kliman et al U.S. Pat. No. 4,761,703 and Kliman U.S. Pat. No. 5,049,815. A system which advantageously can employ the subject invention is disclosed in concurrently-filed Bowers et al application Ser. No. 08/320, 152, filed Oct. 7, 1994, entitled "Proactive Motor Monitoring for Avoiding Premature Failures and for Fault Recognition". Analysis of flux signals is noninvasive, relatively fast, and can be accomplished without taking the motor out of service.

An electric motor by definition produces magnetic flux. Any small imbalance in the magnetic or electric circuit of the motor effectively magnifies axially transmitted fluxes, and a flux coil may be employed as a sensor for detecting flux signals. A frequency spectrum analysis, such as by employing a Fast Fourier Transform (FFT), reveals the existence of a great many frequency components, with relatively complex relationships. In most cases, the frequency spectrum in principle contains sufficient information to determine motor speed.

Kliman et al U.S. Pat. No. 4,761,703 among other things discloses an analysis technique whereby analysis of a flux frequency spectrum is employed to determine slip frequency and thus running speed, since slip is the difference between motor synchronous speed and the actual running speed. (The synchronous speed of an AC induction motor is determined by the formula two times the AC power line frequency divided by the number of motor poles. An AC induction motor which is unloaded runs nearly at its synchronous speed, and runs at lower speeds as load increases.)

More particularly, Kliman et al, in U.S. Pat. No. 4,761, 703, disclose an approach whereby an FFT is performed on time domain data acquired by sampling a flux signal, and the maximum FFT bin of the resulting flux spectra in a predefined frequency range, typically between 0.1 Hz and 1.5 Hz is found. A "best estimate" of the slip frequency is then computed using an interpolation technique described by Kliman et al. This approach can fail if no peaks are present in the 0.1 Hz to 1.5 Hz frequency range as can occur for certain speed motors. Also, there sometimes is excessive noise in signals at such low frequencies.

Kliman, in U.S. Pat. No. 5,049,815, discloses a different technique. Rather than analyzing a flux signal, in the disclosure of U.S. Pat. No. 5,049,815 it is proposed to analyze a motor current signal. In any event, as disclosed in Kliman U.S. Pat. No. 5,049,815, sideband peaks about line frequency are analyzed, looking for symmetrical pairs of sidebands as indicators of slip frequency. The slip frequency candidates are then subjected to further qualifying tests as described in the Kliman patent.

While the approach disclosed in the Kliman et al and Kliman patents may very well be effective for the particular motors analyzed, there remains a need for a general purpose approach to determining motor rotational speed, based particularly on magnetic flux signals, which works reliably with a wide variety of AC induction motors of different characteristics.

Determining motor rotational speed from magnetic flux signals or even current signals is not particularly simple or straightforward. The disclosure of Kliman U.S. Pat. No. 5,049,815 illustrates this complexity to some extent. This is particularly so in the general case, when the characteristics of a given motor are not well known in advance. For example the characteristics of a 12-pole 60 Hz AC induction motor with a synchronous speed of 600 RPM are very different from the characteristics of a 2-pole 60 Hz AC induction motor with a synchronous speed of 3600 RPM. Thus, in a general purpose instrument employed to maintain a variety of AC induction motors and associated equipment in a facility, it is a requirement that accurate results be obtained with a wide variety of motors of various sizes and configurations.

SUMMARY OF THE INVENTION

It is accordingly an object of the invention to provide apparatus for determining the rotational speed of an AC induction motor based on sensed magnetic flux.

It is another object of the invention to provide such apparatus which can be employed with a wide variety of induction motors, of different sizes and constructions.

In accordance with the invention, apparatus for determining the rotational speed of an AC induction motor includes a magnetic flux transducer for sensing magnetic flux generated by the motor during operation, and a data processing system which includes a spectrum analyzer receiving signals from the magnetic flux transducer for generating a flux frequency spectrum having a set of peaks each characterized by a frequency and an amplitude, and various additional elements, which may be implemented by appropriate programming, for performing various analysis strategies.

In overview, assuming an AC power line frequency of 60 Hz, the spectrum analysis is performed over a minimum frequency range of at least three times the motor rotational speed and two times AC line frequency, whichever is greater, and with a resolution of approximately 0.06 Hz/division. If available, up to the largest 200 peak values and their associated frequencies are acquired from the flux spectrum, and used for subsequent analyses to determine motor speed. In this regard, it may be noted that, when an AC induction motor is operating under load, a rich and complex set of spectral peaks occurs. However, in the case of an unloaded induction motor, operating essentially at synchronous speed, the various peaks related to slip frequency tend to be clustered around the 60 Hz line frequency, making it difficult to resolve many individual peaks. Similarly, AC induction motors having multiple pole pairs produce flux signals with more spectral peaks than does a 2-pole motor.

The approach of the invention involves two phases. If the flux spectrum with a sufficient number of peaks over a sufficient frequency range is available, a Phase I analysis is usually sufficient to determine the motor rotational speed. In cases where a flux frequency spectrum over a sufficient range is not available, or where the Phase I analysis simply fails to achieve a result, then a Phase II analysis is employed.

More particularly, during the Phase I analysis in accordance with the invention, the analysis elements are operable to search the flux frequency spectrum for a plurality of sets of particularly defined families of peaks indicative of various possible rotational speeds, and selecting for each set the possible speed having the highest family score as a candidate speed. Analysis elements are further operable to determine whether there is a candidate speed with an overall score which exceeds a predetermined threshold and, if so, determining the motor rotational speed as that candidate speed.

One of the families of peaks in accordance with the invention is defined as motor rotational frequency and harmonics thereof. Another one of the families of peaks is defined as members of a sideband family of motor rotational frequency and harmonics thereof as sidebands about the line frequency. Yet another one of the families is defined as members of a slip sideband family defined as a slip sideband and harmonics thereof as sidebands about a member of the sideband family of motor rotational frequency and harmonics thereof as sidebands about the line frequency, where the slip sideband is defined as the number of motor poles times slip frequency, and where slip frequency is the difference between motor synchronous speed and motor rotational speed.

The phase II analysis of the invention is required when the Phase I analysis fails to reach a result, including situations where the available spectral data is insufficient for determination via Phase I. An example where spectral data is likely to be insufficient is the case of a two-pole motor where many spectral components required for analysis are hidden by close proximity to the nominal 60 Hz line frequency.

In any event, Phase II employs five additional family set definitions which, taken in combination with the Phase I family set definitions, are a relatively exhaustive collection of possible family sets containing useful information on which a motor speed determination may be made.

For Phase II, the five largest peaks within a search range from line frequency (but excluding the line frequency itself) down through a frequency which is 2×SSDB below line frequency are identified. SSDB is defined as the fundamental sideband frequency occurring at the number of poles times slip frequency (NP×SF), where the speed used to calculate SSDB is either the best estimate from Phase I or the rated nameplate speed. For each of the five peaks, in a more extensive analysis five family sets are searched for to determine candidate speeds. Three of these five are the same three as in Phase I. The other two are number of poles times slip frequency families, and number of poles times slip frequency families as sidebands about line frequency.

For each of the candidate speeds thus determined the total energy content and the family score are determined. Extra weight is given to candidate speeds which are closest to the Phase I results, as well as those within a reasonable local range. The candidate speed with the highest overall score is then accepted as the motor rotational speed.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
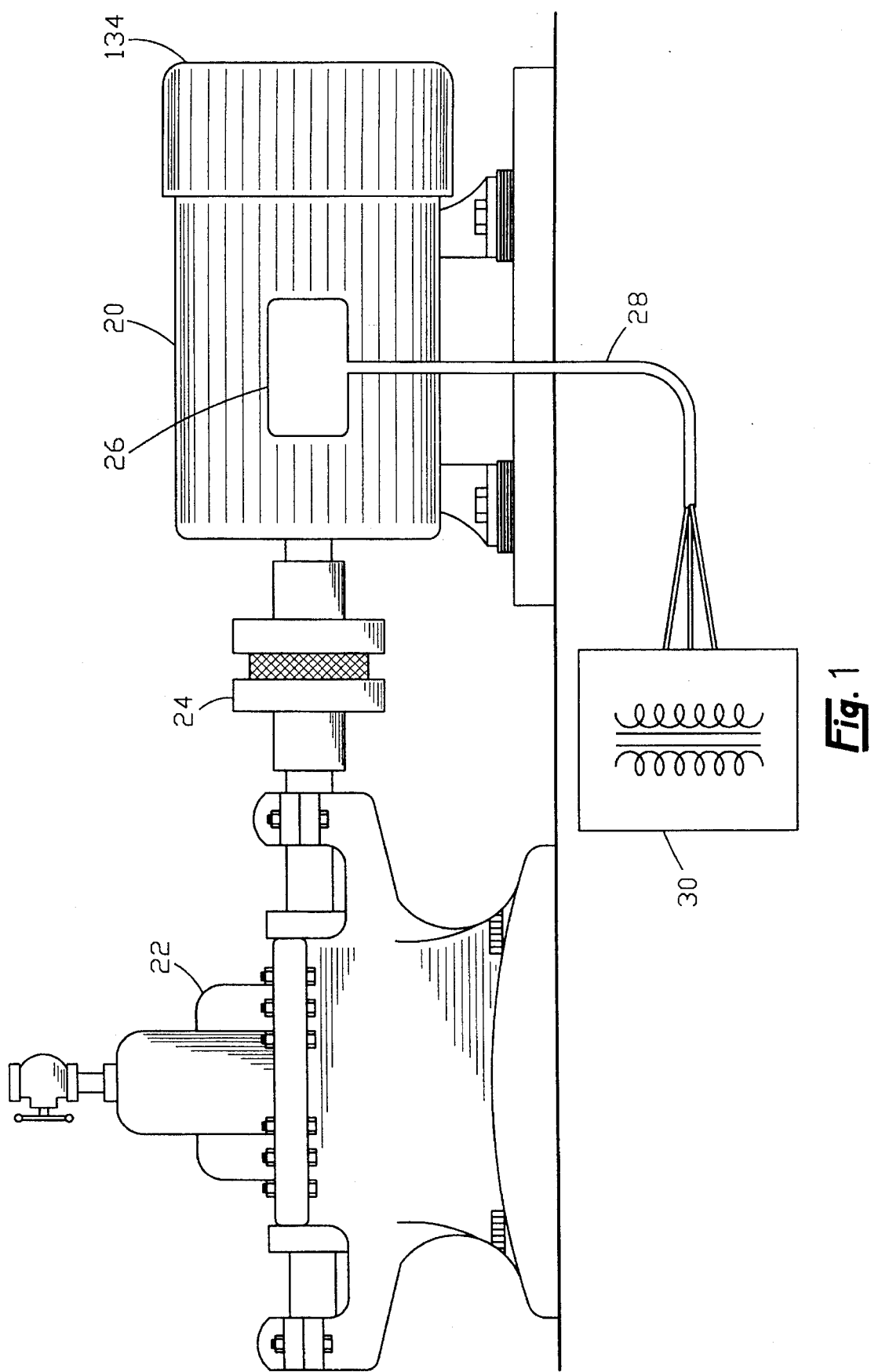
FIG. 1 depicts the environment in which the invention may be employed, in particular, a three-phase AC induction motor driving a pump through a shaft coupling.

Referring initially to FIG. 1, an environment in which the present invention may be employed takes the form of a three-phase AC induction motor 20 driving a pump 22 through a shaft coupling 24. The motor 20 includes a motor termination box 26 which houses an electrical junction at which conductors from power lines within a conduit 28 are connected to supply lines (not shown) of the motor. The motor 20 is powered from an AC power line, depicted in highly schematic fashion as a transformer 30. A typical nominal AC power line frequency is 60 Hz, although 50 Hz is employed in some countries.

The invention also applies to variable speed induction motors, where the motor itself is supplied with power at a "line frequency" which is not the main AC power line frequency.

As is well known, the motor internally employs a given number of magnetic poles, organized as pole pairs. The motor synchronous speed (maximum unloaded speed) is equal to the AC line frequency divided by the number of pole pairs. Thus, the synchronous speed of a two-pole motor for example is 60 revolutions per second (RPS), or 3600 revolutions per minute (RPM). The synchronous speed of a four-pole motor for example is 30 RPS or 1800 RPM. As yet another example, the synchronous speed of a ten-pole motor is 12 RPS, or 720 RPM.

The actual running speed of a motor under load is less than the synchronous speed, and the difference between synchronous speed and running speed is known as the slip frequency. When synchronous speed and running speed are both expressed in units of revolutions per second (RPS), the slip frequency is then expressed in Hertz (Hz). For example, a four-pole motor may be rated at 1740 rpm at full load, making the rated slip frequency (1800–1740)=60 RPM, which is equivalent to a slip frequency of 1 Hz.

Figure 2A:
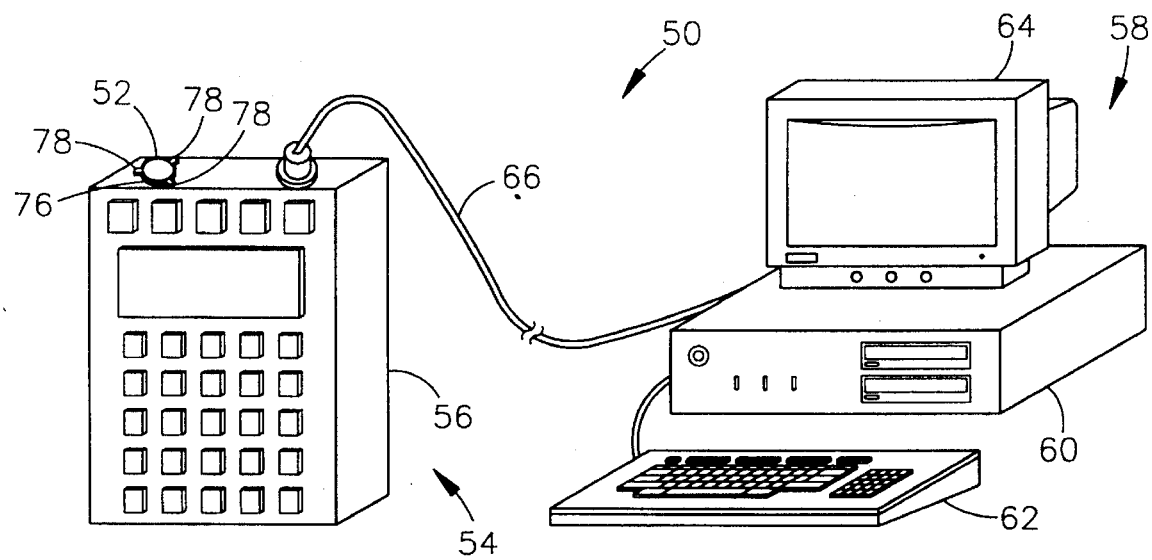
FIG. 2A depicts apparatus of the invention in overview, including a flux coil selectively connectable to a microprocessor-based portable data collector.

Referring next to FIG. 2A, apparatus 50 in accordance with the invention includes a magnetic flux transducer in the representative form of a flux coil 52, and a data processing system 54 illustratively comprising a microprocessor-based portable data collector 56, and a base unit 58. The base unit 58 preferably takes the form of a conventional personal computer (PC) including a CPU unit 60, a keyboard 62 and a video display monitor 64. The portable data collector 56 and the base unit 58 are capable of at least periodically being linked for data transfer via a representative RS232 communications link 66. Although a wired RS232 communications link is illustrated, it will be appreciated that any suitable link may be employed for data transfer, such as an optical communications link, a radio communications link, or a removable memory card. The flux coil 52 is selectively connectable to the portable data collector 56 through an appropriate connector 76.

While, generally, the base unit 58 is employed for long-term data storage and more elaborate data analysis, it will be appreciated that the portable data collector 56 may include significant data storage and processing capability, and the distribution of computational and storage functions as between the two elements 56 and 58 of the data processing system 54 is a matter of design choice. For example, with appropriate miniaturization technology, all of the required functions may be embodied in the portable data collector 56.

The flux coil 52 more particularly is a relatively simple sensor made of insulated magnet wire wound into a coil. Normally, wire size ranges from 20 AWG to 30 AWG. The more turns, the larger the signals. Generally, 100 to 200 turns are sufficient. The output from the flux coil sensor 52 is a current signal, the relative amplitude of which depends on the number of turns used to make the coil. A suitable flux coil 52 diameter is eight inches for general purpose use, but can be larger or smaller depending on the physical size of the motor.

When magnet wire is wrapped to form a coil, the resulting flux coil is fairly flexible, and has the apparent advantage that the coil can be shaped to fit in and around many odd-shaped spaces. However, in order to collect repeatable and reliable flux data, consistency is a major concern. Even though subsequent measurements may be taken at the same place on a motor, if the coil shape is significantly different from one measurement to the next, absolute frequency amplitudes can vary. This limits the reliability of trend data as is described in greater detail in the above-identified Bowers et al application Ser. No. 08/320,152. Accordingly, formed flux coil 52 preferably is employed. The flux coil 52 also preferably includes a device for retaining the formed flux coil 52 in position on a motor, such as several permanent magnets 78, or a clip.

Figure 2B:
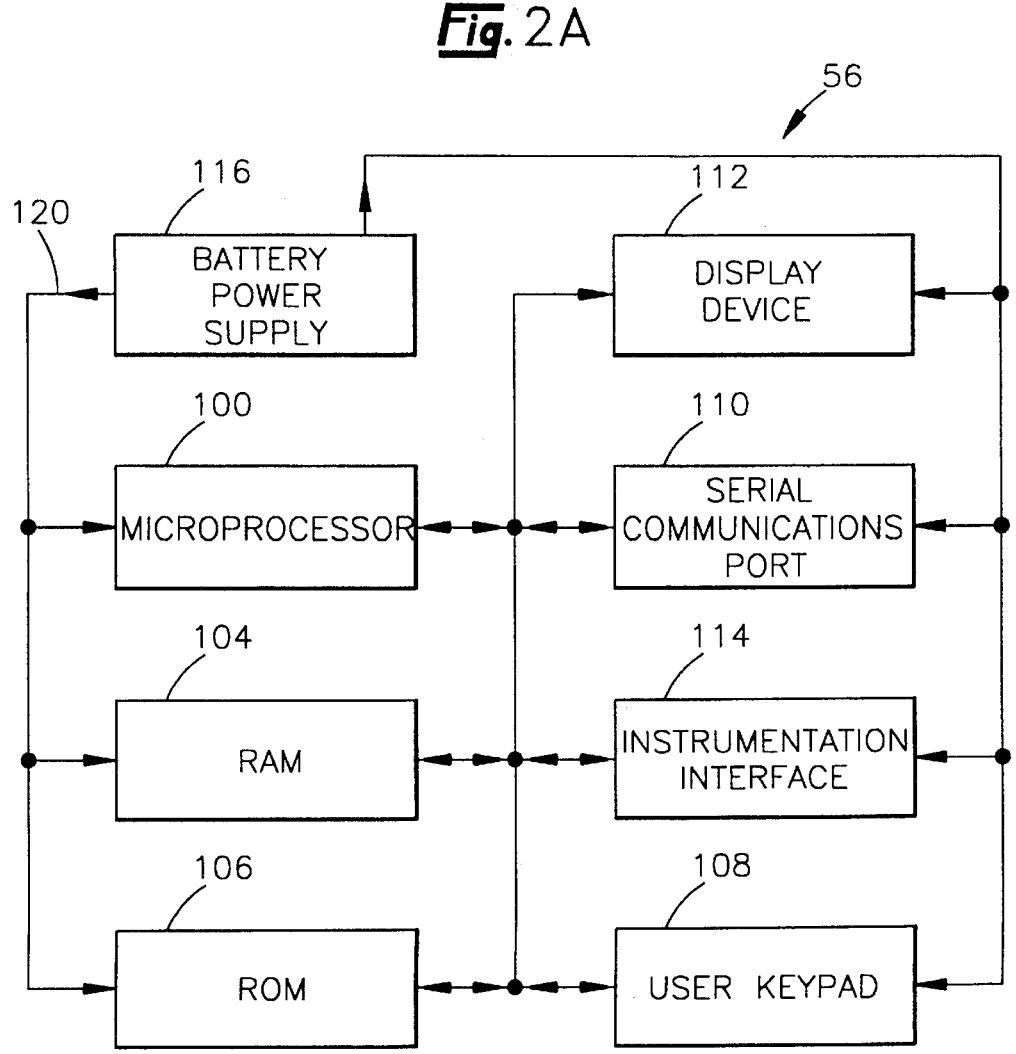
FIG. 2B illustrates in block diagram form internal elements of the FIG. 2A portable data collector.

FIG. 2B is a diagram of the internal arrangement of the portable data collector 56, which may be seen to comprise a conventional microprocessor-based system including a microprocessor 100, such as an Intel 8080 microprocessor or a Zilog Z80 microprocessor, connected to a conventional microprocessor bus 102. Other devices are connected to the bus 102, and are suitably addressed by the microprocessor 100, as is conventional is such systems. These devices include a random access memory (RAM) 104 in which data are stored and, in some cases, program instructions for the microprocessor 100; and a read only memory (ROM) 106 which includes program instructions for the microprocessor 100 or, at the very least, minimal start-up instructions. In some cases, a substantial part of the program instructions for the microprocessor 100 reside in the RAM 104, and these instructions can from time to time be downloaded from the base unit 58 to the portable data collector 56 via the data link 66, which may be a memory card. This allows programming improvements to efficiently be effected, without requiring the replacement of internal components such as the ROM 106.

Other devices connected to the microprocessor bus 102 include a user keypad 108, a serial communications port 110 for connection to the data link cable 64 or memory card, and a display device 112 (likewise also depicted in FIG. 2A). Preferably, the display device 112 is a liquid crystal display, such as an Epson Model No. EG4401Y-ER.

The portable data collector 56 additionally includes an instrumentation interface, generally designated 114, in communication with the bus 102 and to which the FIG. 2A flux coil 52 may selectively be connected through the connector 76. It will be appreciated that the instrumentation interface 114 is conventional, and includes appropriate signal conditioning circuitry, and an analog-to-digital convertor for sampling the signal from the flux coil 52 at an appropriate sampling rate for subsequent analysis, as is well known.

Finally, a battery power supply 116 supplies power to the remaining elements through representative power supply conductors 118 and 120.

Figure 3:
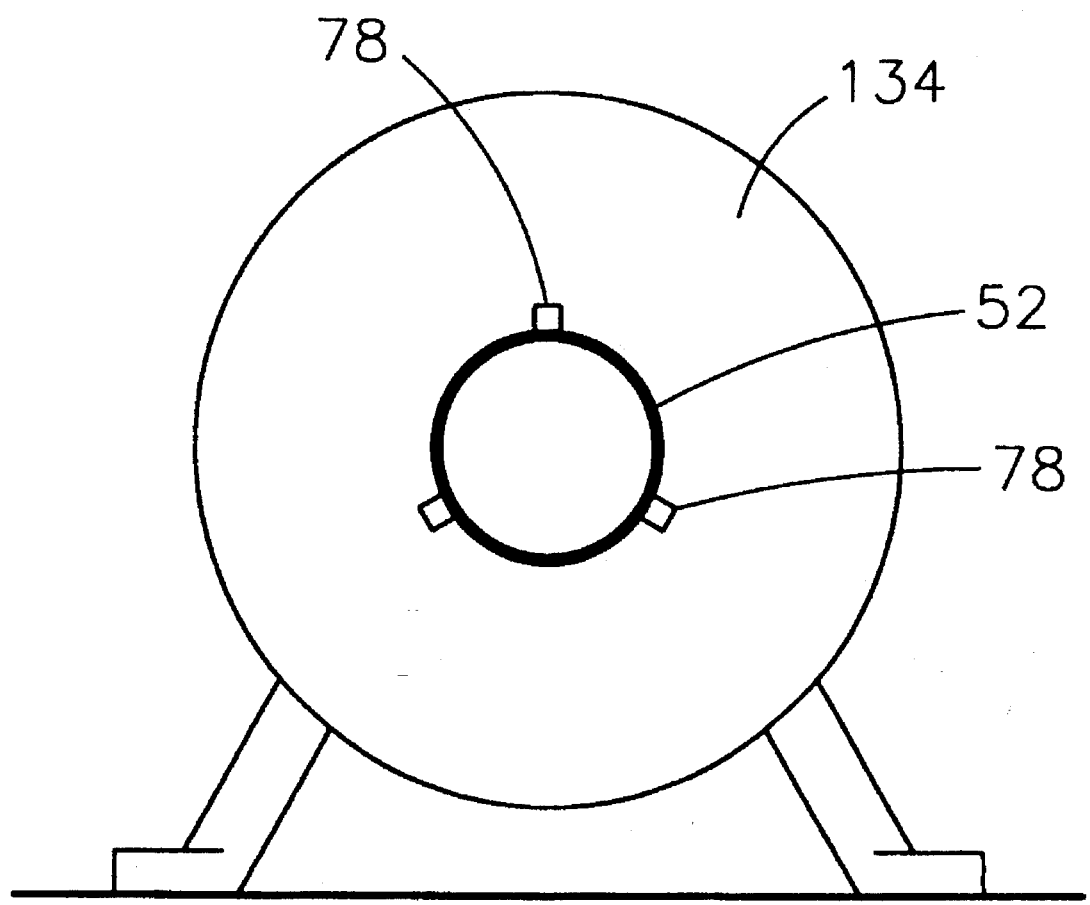
FIG. 3 illustrates the location of a transducer in the form of a flux coil on a typical electric motor.

FIG. 3 is an end view of a typical motor, such as the FIG. 1 motor 20, illustrating a suitable flux coil measurement location. The flux coil 52 is secured to the motor outboard end 134, which is the end not having a projecting shaft, by the mounting device comprising representative magnets 78 in a centered axial position, which position preferably is clearly marked for repeatability.

Elements of the data processing system 54 are operable to perform a spectrum analysis of sampled real time data from the flux coil 52, such as by Fast Fourier Transform (FFT), as is well known in the art. In this particular application, it is not necessary to accomplish the spectrum analysis in real time, which accordingly can be accomplished by appropriate programming in either the portable data collector 56 or the base unit 58. If real time speed is required, a specialized Digital Signal Processor (DSP) device may be employed.

FIGS. 4A through 4E are a flowchart representing programming within the data processing system 54. As previously noted, this programming can either be distributed between the microprocessor-based portable data collector 56 and the base unit 58, or can be implemented solely in one or the other. Various boxes of the flowchart of FIGS. 4A–4E are described hereinbelow with reference to the flux spectra illustrated in FIGS. 5–7.

Figure 5:
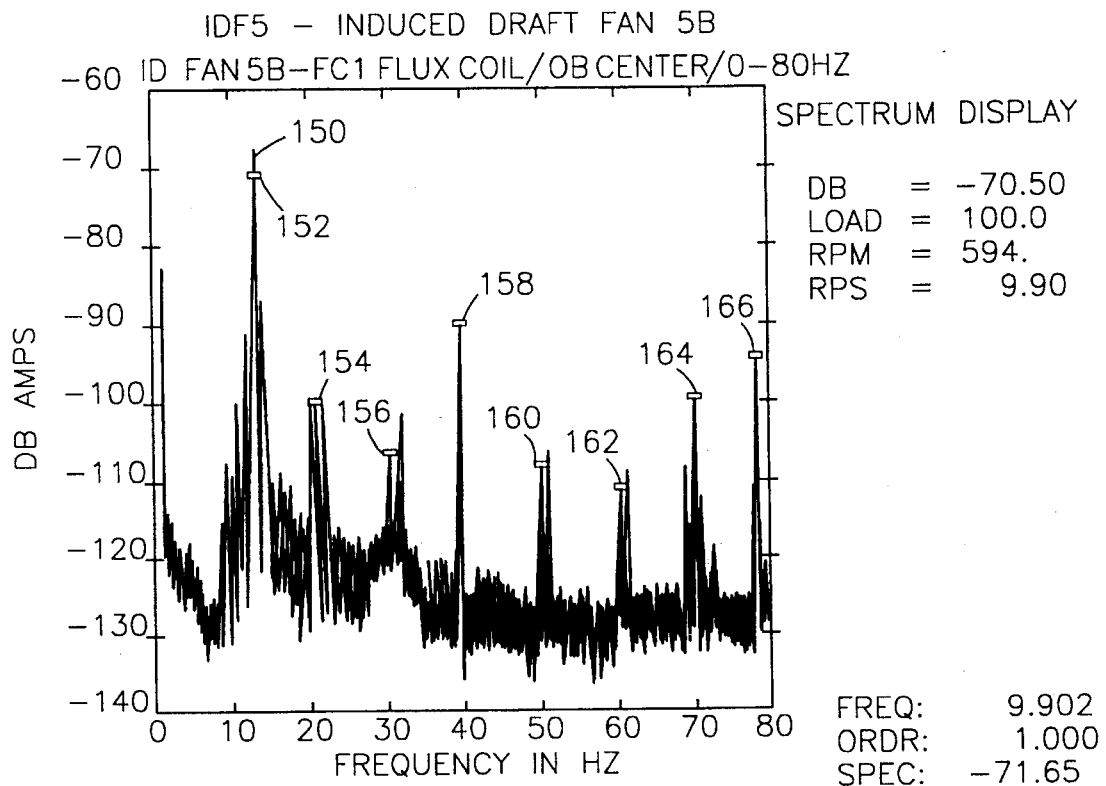
FIG. 5 is a flux frequency spectrum with cursor highlighting of a 1×RPS peak and its harmonic representing a first family set in accordance with the invention.

FIG. 5 represents a flux frequency spectrum over the range of 0 Hz through 80 Hz, resulting from an FFT spectral analysis of a flux data signal acquired from a large AC induction motor operating under load. From FIG. 5, it is apparent that the frequency spectrum is relatively complex. In the practice of the present invention, the largest peaks in the flux frequency spectrum are employed, up to 200 peaks. The particular motor which resulted in the flux spectrum of FIG. 5 is a twelve pole induction motor (six pole pairs). Assuming a 60 Hz AC power line frequency, the synchronous speed is accordingly 600 RPM or 10 RPS, which may be expressed as a 10 Hz rotational frequency. At full load, based on nameplate rated data the rotational speed of the particular motor is 592 RPM (rotational frequency 9.866 Hz), and the motor is rated to draw 100 amps current at full load.

FIG. 5 actually represents the display produced by suitable spectral analysis software, and accordingly includes, in addition to the spectral peaks themselves, a cursor line 150, and a plurality of cursor boxes 152, 154, 156, 158, 160, 162, 164 and 166. The vertical positions of the cursor boxes 152, 154, 156, 158, 160, 162, 164 and 166 indicate the magnitude in dB of any spectral component present at each particular frequency. In this particular case, the cursor line 150 and cursor box 152 are positioned on a frequency of 9.902 Hz, which is considered to be a fundamental frequency in this example, and the remaining cursor boxes 154, 156, 158, 160, 162, 164 and 166 are positioned on frequencies which are harmonics of 9.902 Hz.

Figure 4A:
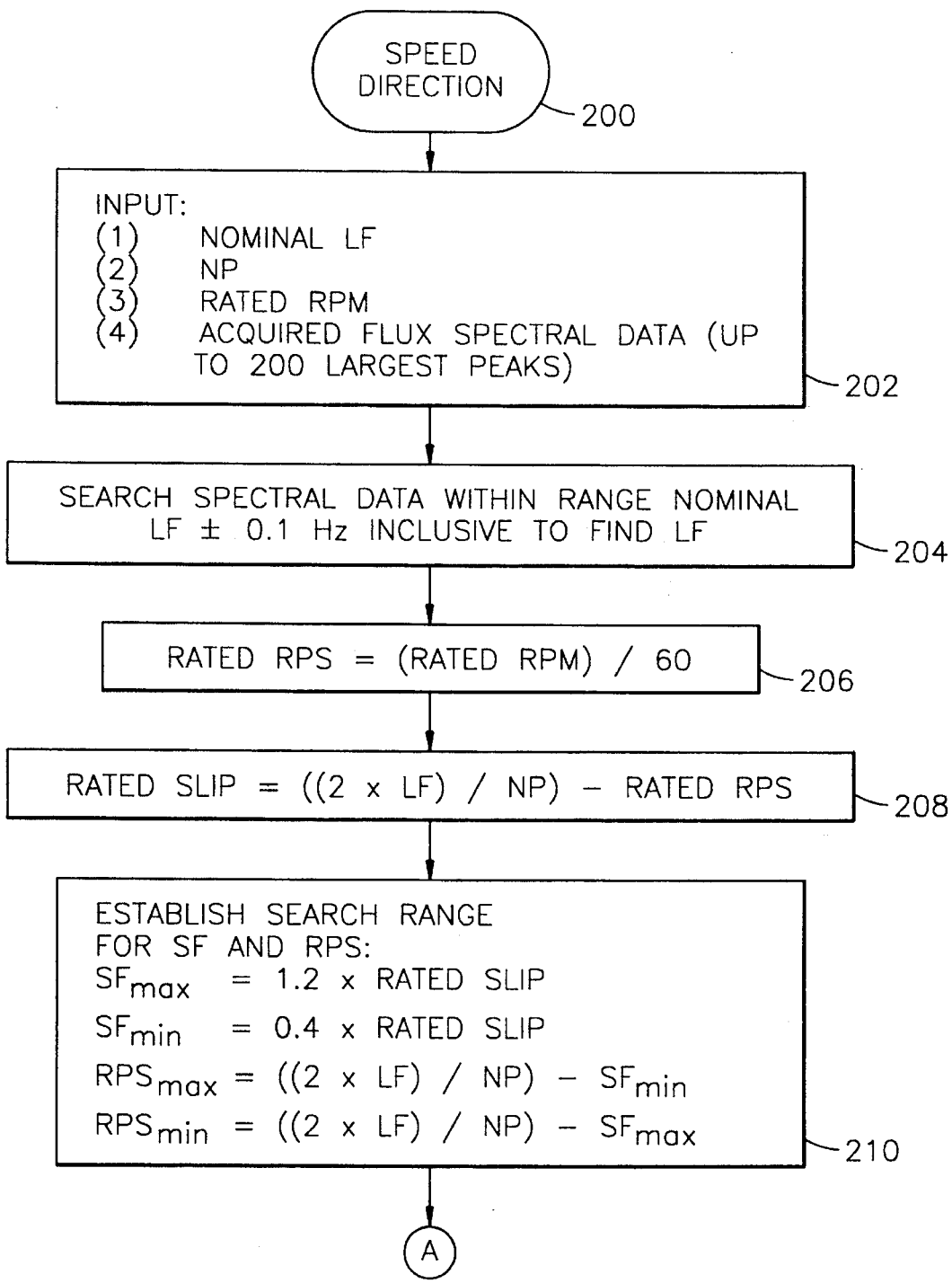
FIGS. 4A–4E are a flowchart representing programming of data processing elements of the invention.
Figure 4B:
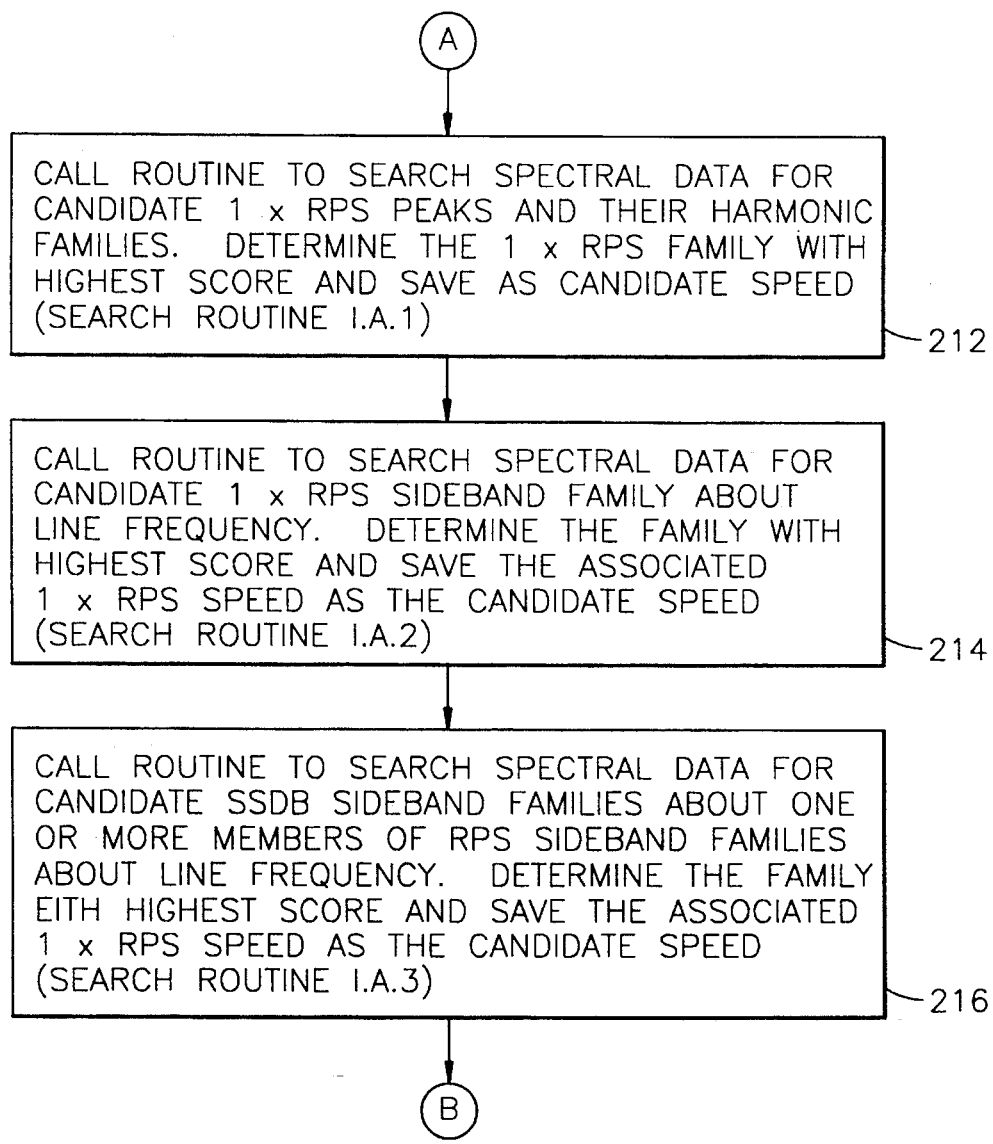
Figure 4C:
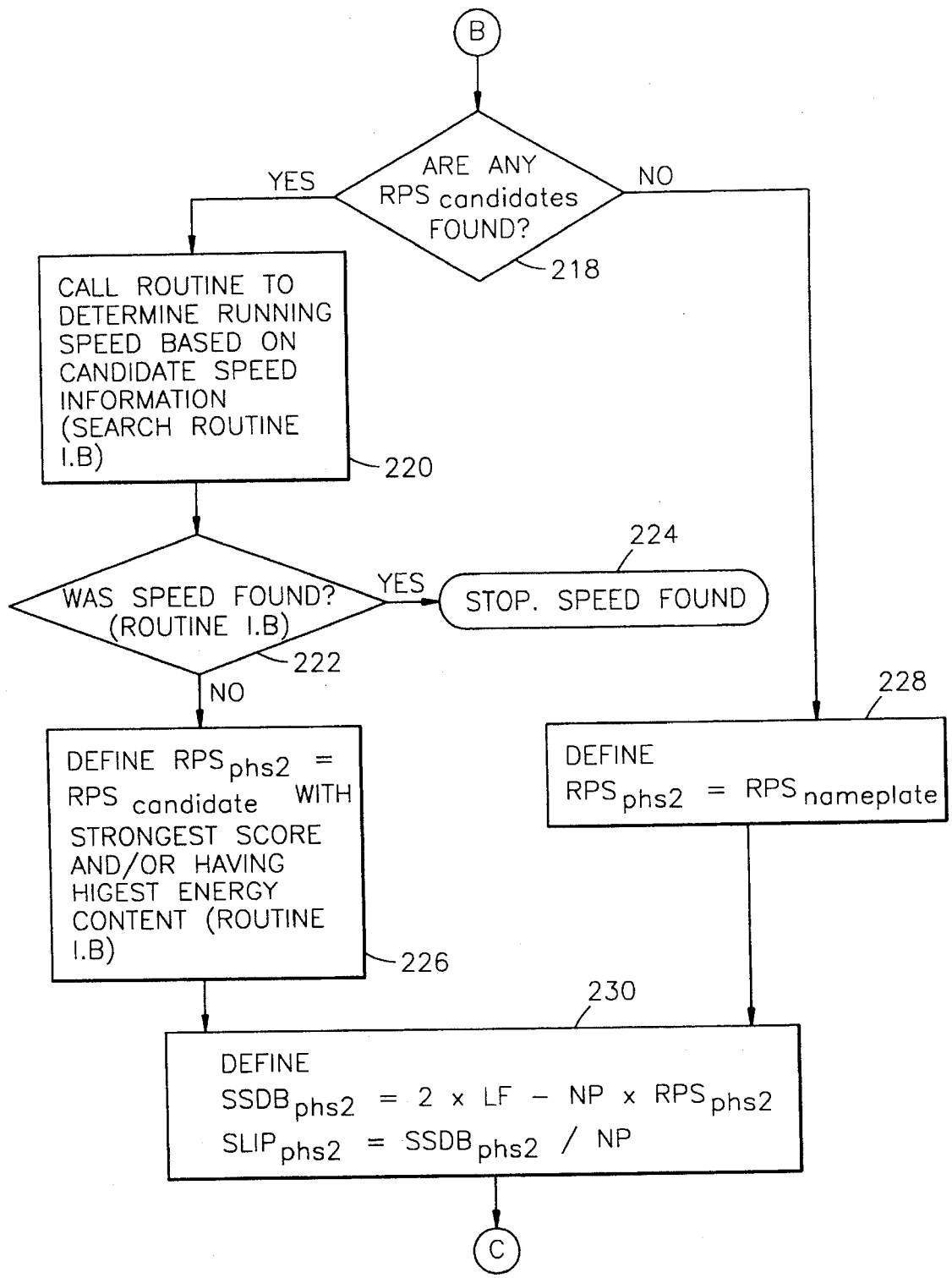
Figure 4D:
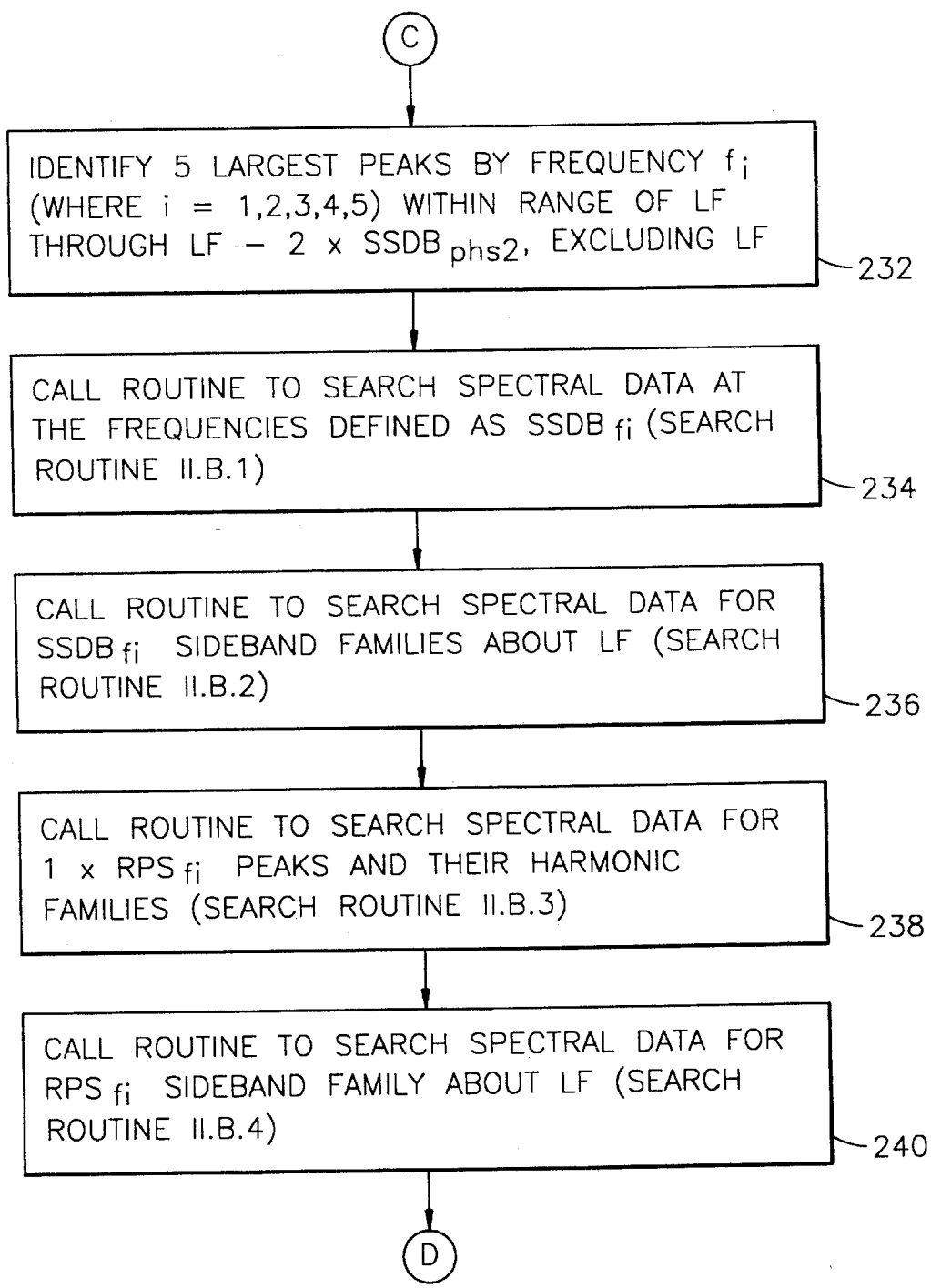
Figure 4E:
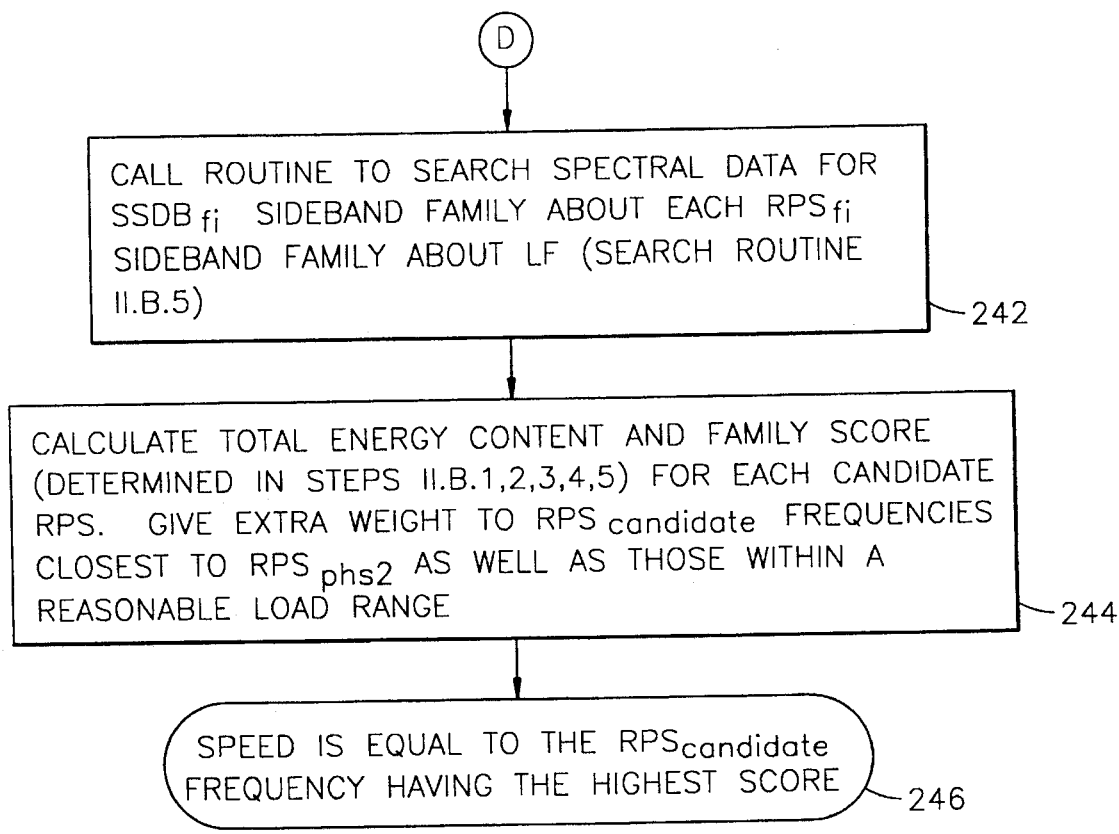

Referring now to the flowchart of FIG. 4A, a speed detection routine in accordance with the invention is entered at 200, and input is accepted in Box 202. The first three items of input indicated are manually entered by a user, and are nominal line frequency, the number of poles and the rated RPM of the motor. These three items are typically indicated as motor nameplate data, or can be derived therefrom. For example, when the motor nameplate indicates operation from a 60 Hz power source and a rated RPM of 592, it can readily be inferred that the synchronous speed of that particular motor is 600 RPM, and that the motor accordingly has six pole pairs, or twelve poles.

The fourth item of data in Box 202 is the acquired flux spectral data, such as is represented in FIG. 5. In an actual data processing implementation, it will be appreciated that the flux spectral data is represented numerically by a frequency and an amplitude for each peak, or equivalent data.

A preliminary step is performed in Box 204, namely, the determination of the actual AC power line frequency. Although 60 Hz is the nominal line frequency (50 Hz in some countries), only rarely is the power line frequency exactly 60 Hz. In the case of a variable speed induction motor, the motor itself is supplied with power at a "line frequency" which may not be the 50 Hz or 60 Hz main AC power line frequency.

The flux spectral data ordinarily has a component at the line frequency, which can be recognized. Accordingly, in Box 204, the spectral data is searched within a range extending from 0.1 Hz on either side of the nominal 60 Hz line frequency, that is, from 59.9 Hz to 60.1 Hz, and the largest peak within that range is assumed to be the line frequency. In the example described herein, the AC power line frequency is 59.98 Hz.

Another preliminary calculation step is performed in Box 206, where the motor rated rotational speed expressed in units of revolutions per second (RPS) or Hz is determined by dividing the motor rated RPM by 60. In this example the result of dividing 592 RPM by 60 seconds/minute is 9.8667 RPS or 9.8667 Hz.

Next, in Box 208, the rated slip (in units of Hz), is calculated by subtracting the rated RPS as determined in Box 206 from the motor synchronous speed, calculated from the formula 2×line frequency (LF) divided by the number of poles (NP), resulting in the synchronous speed of 9.9967 RPS. In this example, (9.9967−9.8667) equals 0.130 as the rated slip.

As a final preliminary step, in Box 210 search ranges for slip frequency (SF) and rotational frequency in RPS are established, based on the rated slip. Thus, $SF_{max}$=(1.2×0.13)=0.156 Hz;

$SF_{min}$=(0.4×0.13)=0.052 Hz;

$RPS_{max}$=(9.9967−0.052)=9.945; and $RPS_{min}$=(9.9967−0.156)=9.841 Hz.

In accordance with the invention, a Phase I analysis procedure searches the flux frequency spectrum for three differently defined families of peaks indicative of various candidate rotational speeds. For each family set, a candidate speed, a respective family score and a respective corresponding total energy content value are developed.

Thus, for searching for the first family, in Box 212 a routine is called to search the spectral data for candidate 1×RPS peaks and their harmonic families, and to determine a candidate speed. This particular routine is termed herein Search Routine I.A.1, which more particularly may be implemented as represented by the following pseudocode:

---

SEARCH ROUTINE I.A.1 Pseudocode

---

Identify peaks by frequency f within range $RPS_{min}$ Hz to $RPS_{max}$ Hz, inclusive
FOR each peak frequency f
    FOR fundamental frequency 1f and each of 2f, 3f, 4f etc.
    harmonic frequencies up through available spectral data
        SAVE frequency and amplitude
    NEXT harmonic frequency
    Calculate total energy content of fundamental and harmonic
    frequency members
    Determine the number of harmonic frequency members that are
    present (above a threshold), and determine a family score
    based on which harmonic frequency members are present, how
    many and the amplitude of each
    Use peak frequency f as possible speed $RPS_{possible}$
        SAVE total energy content, family score, and $RPS_{possible}$
NEXT peak frequency f
SAVE the RPSpossible having highest family score as $RPS_{candidate}$.
Also save associated family score and energy content.
RETURN

---

Thus, and again with reference to FIG. 5, in this particular example peaks within the frequency range 9.841 Hz to 9.945 Hz are identified. Each such peak is considered to be a fundamental frequency, and the frequency and amplitude present at each harmonic frequency of that fundamental frequency is saved. It will be appreciated that only one of the peaks within the search range corresponds to the actual rotational speed of the motor. Accordingly peaks may not actually be present at the harmonic frequencies, such as when a particular peak within the search range 9.841 Hz to 9.945 Hz when considered to be a fundamental frequency is not the one corresponding to the actual rotational speed of the motor. The procedure proceeds as indicated by the above pseudocode.

FIG. 5 in particular indicates the results of a successful analysis, where the cursor line 150 and cursor box 152 are on a peak at a frequency of 9.902 Hz within the search range 9.841 Hz to 9.945 Hz corresponding to the actual rotational speed of the motor. The remaining cursor boxes 154, 156, 158, 160, 162, 164 and 166 are located at frequencies which are harmonics of the 9.902 Hz fundamental frequency and, as is apparent from FIG. 5, have relatively significant energy content. Thus, the motor rotational speed is determined to be 594.1 RPM.

From FIG. 5 and the discussion up to this point with reference to the Search Routine I.A.1, it might be assumed that this determination of motor rotational speed is relatively straightforward. In practice, it is not. Thus, FIG. 5 is the frequency spectrum of a particular motor operating under full load. Frequency spectral data taken from another motor having different constructional characteristics, having a different number of poles, or having internal faults such as broken rotor bars, does not necessarily produce a frequency spectrum which is interrupted so straightforwardly.

Accordingly, in accordance with the invention, two other defined families of peaks are examined, based on other criteria, and all of the families are considered together before reaching a conclusion regarding the actual motor speed.

Thus, from flowchart box 214 another search routine is called, identified as Search Routine I.A.2, which is briefly described hereinbelow with reference to the spectrum analysis of FIG. 6. Search Routine I.A.2 searches the spectral data for members of candidate sideband families comprising motor rotational frequency and harmonics thereof as sidebands about the line frequency, as represented by the following pseudocode:

convenience, the spectral data is examined downwardly to determine the energy values at each frequency which is a sideband harmonic of the fundamental sideband. The routine proceeds as indicated by the above pseudocode, to develop a family set.

Figure 6:
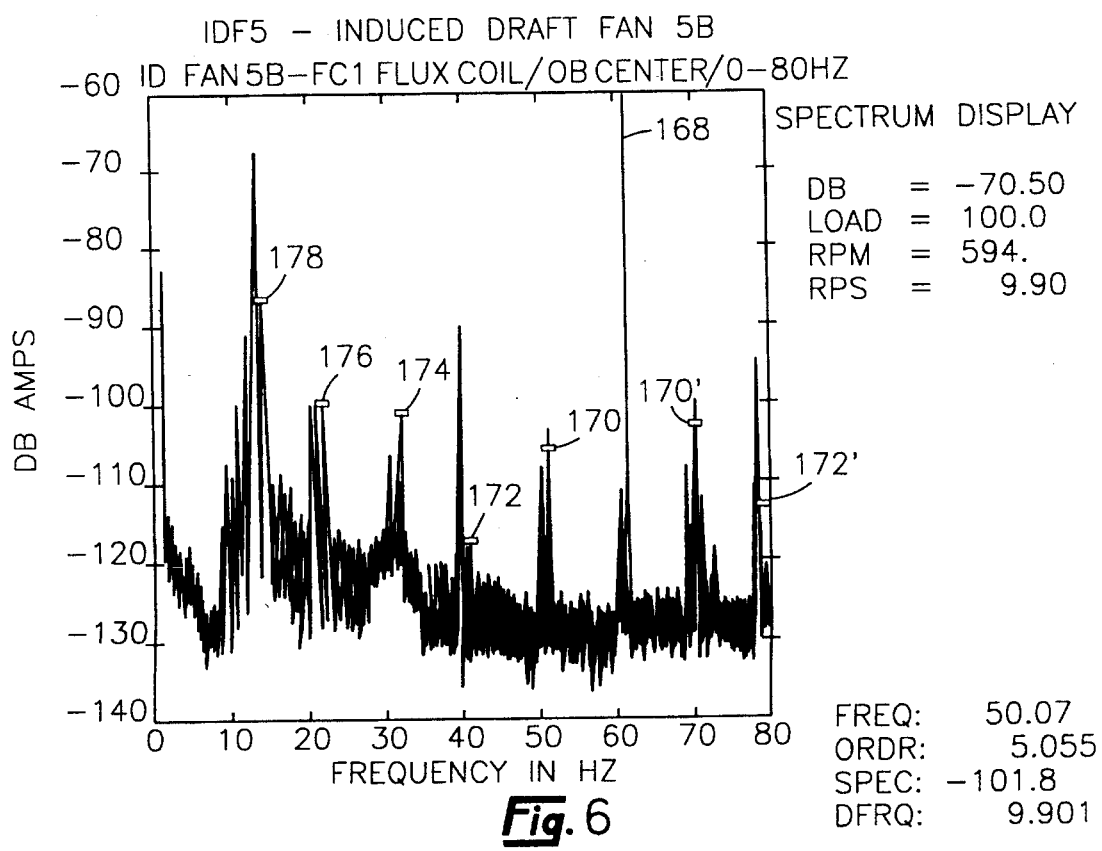
FIG. 6 is a flux spectrum like that of FIG. 5, but with cursor highlighting on a 1×RPS sideband family about line frequency representing a second family set in accordance with the invention.

FIG. 6 indicates the results of one example implementing this analysis which happens to be applied to the same spectral data as FIG. 5, but with different cursor positions. Thus, a line cursor 168 is positioned over the 59.98 Hz line frequency. Cursor box 170 is on a peak at 50.07 Hz within the search range 50.035 Hz through 50.134 Hz, and represents the fundamental of a 1×RPS sideband family below line frequency. Thus, subtracting the 50.07 Hz 1×RPS frequency component indicated by cursor box 170 from the 59.98 Hz line frequency yields 9.901 Hz as the motor rotational frequency which corresponds to 594.1 RPM as before.

Cursor box 170 is the corresponding upper sideband, which is at a frequency of 69.881 Hz, 9.901 Hz above the 59.98 Hz line frequency.

The remaining cursor boxes 172, 174, 176 and 178 are at frequencies which are harmonic multiples of the fundamental sideband frequency of cursor box 170 as sidebands about line frequency, and are evenly spaced at 9.901 Hz intervals.

It will be appreciated that there is a corresponding set of upper sidebands, such as the depicted cursor boxes 170' and 172' which could similarly be analyzed. However, analysis of the lower sidebands is used in practice.

Flowchart box 216 calls a routine to search the spectral data for candidate families in accordance with a third family definition, which is somewhat more complex than the first two described hereinabove. This particular family is defined as a slip sideband (SSDB) family about one or more members of the RPS sideband families about line frequency. Thus, one of the members of the 1×RPS sideband family of

---

SEARCH ROUTINE I.A.2 Pseudocode

Identify peaks by frequency f within range (LF − $RPS_{max}$) Hz to
(LF − $RPS_{min}$) Hz, inclusive such that f = LF − $RPS_f$ where $RPS_f$ is
a candidate running speed associated with the frequency f.
FOR each peak frequency f
    FOR first sideband frequencies (LF ± $RPS_f$) and each of
    (LF ± 2 × $RPS_f$), (LF ± 3 × $RPS_f$), (LF ± 4 × $RPS_f$) etc.
    frequencies down through available spectral data
        SAVE frequency and amplitude of sideband family member
    NEXT sideband frequency
    Calculate the total energy content of sideband family
    Determine the number of sideband family members that are
    present (above a threshold), and determine a family score
    based on which sideband family members are present, how many
    and the amplitude of each
    Calculate the candidate speed $RPS_{candidate}$ which would
    correspond to that frequency as a 1 × RPS sideband, using
    formula $RPS_{possible}$ = LF − f
    SAVE total energy content, family score, and $RPS_{possible}$
NEXT peak frequency f
SAVE the $RPS_{possible}$ with highest family score as $RPS_{candidate}$.
Also save associated family score and energy content.
RETURN

---

In this case, where the line frequency is 59.98 Hz, and where $RPS_{max}$ and $RPS_{man}$ were determined in box 210 to be 9.945 Hz and 9.841 Hz, respectively, the search range is 50.035 Hz through 50.139 Hz. Each of the peaks within this range is viewed as a candidate 1×RPS sideband about line frequency as the fundamental sideband. As a matter of box 214 and the Search Routine I.A.2 described hereinabove is considered as the center frequency about which slip sideband (SSDB) families occur, and the relevant family comprises sidebands about a sideband about line frequency.

The following pseudocode represents the routine:

SEARCH ROUTINE I.A.3 Pseudocode

Figure 7:
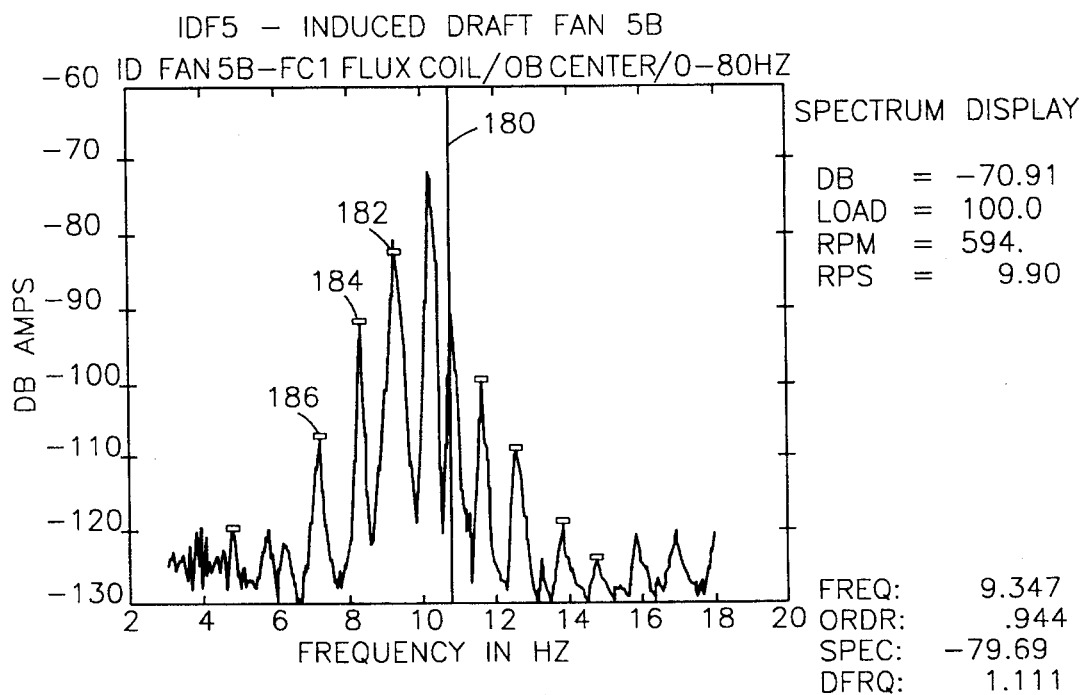
FIG. 7 shows a flux frequency spectrum display in the range of 2 Hz to 18 Hz with cursor highlighting on a slip sideband family as sidebands about a member of a sideband family of motor rotational frequency and harmonics thereof as sidebands about the line frequency, illustrating a third family set in accordance with the invention.

Predefine at least one member of an RPS sideband family about
line frequency selected from the set (LF ± (((NP/2) − i) × RPS)),
where i = 0, 1, . . . (NP/2 − 1), such as
(LF − (((NP/2) − 1) × RPS)), where i = 1 and sidebands below LF
are considered
Identify a frequency range to search for a center frequency, e.g.
(LF − (((NP/2) − 1) × $RPS_{max}$)) Hz to
(LF − (((NP/2) − 1) × $RPS_{min}$)) Hz
Select the largest peak in this range as center frequency (CF).
If no peak is present within this range, select the speed from
I.A.1 and I.A.2 having the highest family score to calculate a
center frequency (CF), i.e.
(LF − (((NP/2) − 1) × $RPS_{I.A.1\ OR\ I.A.2}$)) Hz
Identify peaks by frequency f within range, e.g.
(LF − (((NP/2) − 1) × $RPS_{max}$) − 4 × $SF_{max}$) Hz to
(LF − (((NP/2) − 1) × $RPS_{min}$) + 4 × $SF_{max}$) Hz
FOR each peak frequency f
    Define $NPSF_{possible}$ as (CF−f).
    FOR first possible SSDB sideband frequency about center
    frequency CF calculated as (CF − $NPSF_{possible}$) and each of
    (CF − 2 × $NPSF_{possible}$), (CF − 3 × $NPSF_{possible}$) etc.
    possible SSDB sideband family members down through available
    spectral data
        SAVE frequency and amplitude
    NEXT possible SSDB sideband family member
    Calculate the total energy content of SSDB sideband family
    Determine the number of possible SSDB sideband family
    members that are present (above a threshold), and determine
    family score based on which members are present, how many
    and the amplitude of each
    Define $RPS_{possible}$ as (((2 × LF)/NP) − ($NPSF_{possible}$/NP))
    SAVE total energy content, family score, and $RPS_{possible}$
NEXT frequency f
SAVE the $RPS_{possible}$ with highest family score as $RPS_{candidate}$.
Also save associated family score and energy content
RETURN The above pseudocode begins by predefining one member of an RPS sideband family from the Search Routine I.A.2. In this particular example, the (LF−5×RPS) sideband member is selected, as represented by cursor box 178 in FIG. 6, at a frequency of 10.475 Hz. In FIG. 7, the line cursor 180 is placed on that particular one of the 1×RPS sideband family members about line frequency, namely the 5×RPS lower sideband corresponding to FIG. 6 cursor box 178. Cursor boxes 182, 184 and 186 then indicate SSDB sideband family members about the 1×RPS sideband family members.

After all three sets of candidate speeds have been determined, the flowchart continues with decision box 218 where the data from the analyses of the routines called by boxes 212, 214 and 216 is examined to determine whether any candidate rotational speeds were found. If the answer is yes, then execution proceeds to box 220, where Search Routine I.B is called to determine running speed based on the candidate speed information. If no definite candidate speed is found, a starting point for the Phase II may be determined. Search Routine I.B is represented by the following pseudocode:

SEARCH ROUTINE I.B PSEUDOCODE

For the set of candidate speeds ($RPS_{candidate}$) obtained from all
3 search routines I.A.1, I.A.2 and I.A.3, determine the running
speed with the highest overall score based on frequency matching
between the three, energy content and family score.
IF overall score exceeds a predefined threshold
    THEN running speed is $RPS_{candidate}$ with the highest overall
    score.
ELSE
    Define $RPS_{phs2}$ = $RPS_{candidate}$ having the highest energy -continued

SEARCH ROUTINE I.B PSEUDOCODE content and/or family score

In decision box 222, which represents a portion of the Search Routine I.B Pseudocode, a decision is based on whether the running speed was found and, if so, the routine exits at 224.

If not, then execution proceeds to box 226, also represented by a portion of Routine I.B, where the candidate speed with highest energy is found, and $RPS_{phs2}$ is defined as the candidate speed with the strongest score or the highest energy content.

If the results of decision box 218 was no, then in box 228 $RPS_{phs2}$ is defined simply as the rated RPS based on motor nameplate data.

In either event, box 230 is entered, which is part of the Phase II analysis procedure in accordance with the invention.

Figure 8:
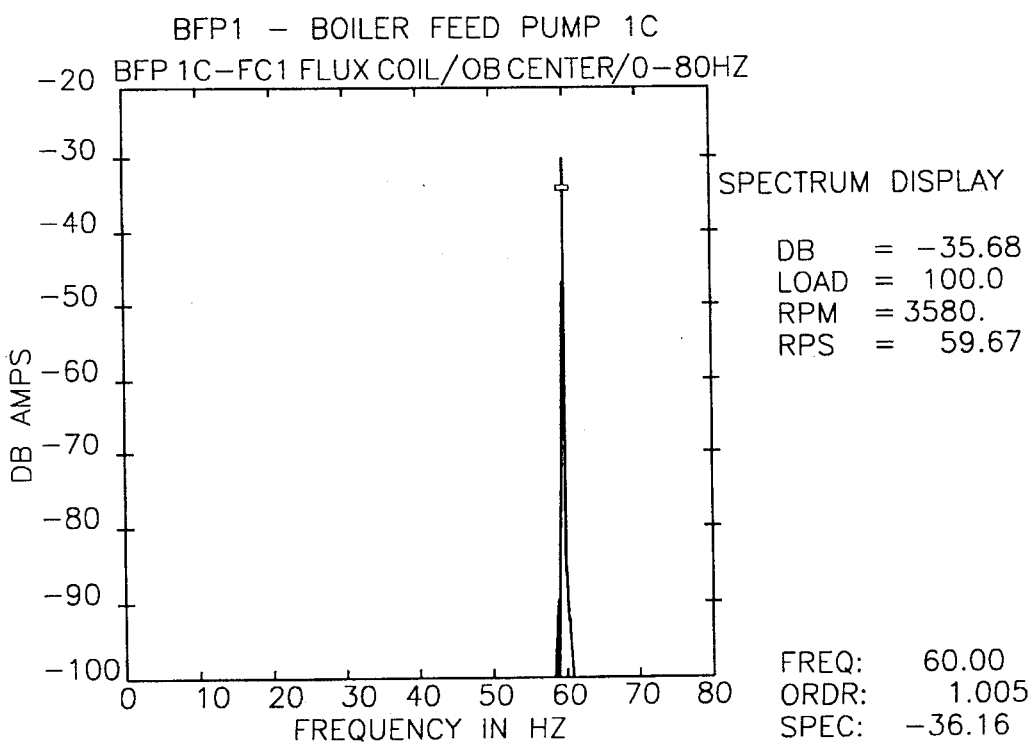
FIG. 8 is a flux frequency spectrum insufficient for a phase I analysis in accordance with the invention, such as can result when a motor is lightly loaded.

FIG. 8 is an example of a flux frequency spectrum illustrating a case where there is insufficient data for a Phase I analysis. The spectrum of FIG. 8 is from a 2-pole motor (synchronous speed 3600 RPM) with a rated (nameplate) RPM of 3580. This corresponds to a rated slip of 20 RPM, or 0.333 Hz.

Phase II thus continues in box 232 by identifying the five largest peaks within the range of line frequency down through line frequency −2×$SSDB_{phs2}$, excluding line frequency.

Then, from the next five flowchart boxes 234, 236, 238, 240 and 242, appropriate search routines respectively identified as II.B.1, II.B.2, II.B.3, II.B.4 and II.B.5 are called.

Thus, the following routine expressed in pseudocode form and called from flowchart Box 234 searches the spectral data for $SSDB_{fi}$ families, where SSDB means an NP×SF slip sideband, and the subscript "fi" indicates the particular one of the five peak frequencies used as indicative of a particular candidate speed:

---
SEARCH ROUTINE II.B.1 PSEUDOCODE
---
FOR each peak frequency $f_i$
DEFINE $SSDB_{fi} = LF - f_i$
    FOR first low frequency peak occurring at $SSDB_{fi}$ and each of
    $2 \times SSDB_{fi}$, $3 \times SSDB_{fi}$, $4 \times SSDB_{fi}$ etc. possible family
    members down through available spectral data
        SAVE frequency and amplitude
    NEXT possible family member
    Calculate the total energy content of possible family
    Determine the total energy of possible family members that
    are present (above a threshold), and determine a family
    score based on which members are present, how many and the
    amplitude of each.
    Calculate the candidate speed $RPS_{candidate}$ which would
    correspond to the $SSDB_{fi}$ using the formula
    $RPS_{candidate} = 2 \times LF/NP - SSDB_{fi}/NP$
    SAVE total energy content, family score and $RPS_{candidate}$
NEXT peak frequency $f_i$
RETURN
---

The following routine expressed in pseudocode form is then called from flowchart Box 236 and searches the spectral data for $SSDB_{fi}$ sideband families about line frequency:

---
SEARCH ROUTINE II.B.2 PSEUDOCODE
---
FOR each peak frequency $f_i$
DEFINE $SSDB_{fi} = LF - f_i$
    FOR first sideband frequencies ($LF \pm SSDB_{fi}$) and each of
    ($LF \pm 2 \times SSDB_{fi}$), ($LF \pm 3 \times SSDB_{fi}$), ($LF \pm 4 \times SSDB_{fi}$) etc.
    possible sideband family members down through available
    spectral data
        SAVE frequency and amplitude
    NEXT possible sideband family member
    Calculate the total energy content of possible sideband
    family
    Determine the total energy of possible sideband family
    members that are present (above a threshold), and determine
    a family score based on which members are present, how many
    and the amplitude of each
    Calculate the candidate speed $RPS_{candidate}$ which would
    correspond to the $SSDB_{fi}$ using the formula
    $RPS_{candidate} = 2 \times LF/NP - SSDB_{fi}/NP$
    SAVE total energy content, family score and $RPS_{candidate}$
NEXT peak frequency $f_i$
RETURN
---

Called from Box 238, the following routine searches the spectral data for $1 \times RPS_{fi}$ peaks and their harmonic families. These are actually the same peaks as were searched for by Search Routine I.A.1 called from Box 212, with one of the five peak frequencies being indicative of a particular candidate speed:

---
SEARCH ROUTINE II.B.3 PSEUDOCODE
---
FOR each peak frequency $f_i$
DEFINE $RPS_{fi} = (2 \times LF/NP) - SSDB_{fi}/NP$
    FOR fundamental frequency $RPS_{fi}$ and each of $2 \times RPS_{fi}$,
    $3 \times RPS_{fi}$, $4 \times RPS_{fi}$ etc. possible harmonic frequencies up
    through available spectral data
        SAVE frequency and amplitude
    NEXT possible harmonic frequency
    Calculate the total energy content of fundamental and
    possible harmonics -continued
---
SEARCH ROUTINE II.B.3 PSEUDOCODE
---
    Determine the total energy of possible harmonic
    frequencies that are present (above a threshold), and
    determine a family score based on which members are
    present, how many and the amplitude of each
    Use peak frequency $RPS_{fi}$ as candidate speed $RPS_{candidate}$
    SAVE total energy content, family score and $RPS_{candidate}$
NEXT peak frequency $f_i$
RETURN
---

Next, the following routine, called from flowchart Box 240, searches the spectral data for an $RPS_{fi}$ sideband family about line frequency. These are the same peaks as were searched for by Search Routine I.A.2 called from Box 214:

---
SEARCH ROUTINE II.B.4 PSEUDOCODE
---

FOR each peak frequency $f_i$
Identify peaks by frequency $f_{rpssbi}$ such that
$f_{rpssbi} = LF - RPS_{fi}$ where $RPS_{fi}$ is a candidate running speed
associated with the frequency $f_i$
    FOR first sideband frequency $(LF \pm RPS_{fi})$ and each of
    $(LF \pm 2 \times RPS_{fi})$, $(LF \pm 3 \times RPS_{fi})$, $(LF \pm 4 \times RPS_{fi})$ etc.
    possible sideband family members down through available
    spectral data
        SAVE frequency and amplitude
    NEXT possible sideband family member
    Calculate the total energy content of possible sideband
    family
    Determine the total energy of possible sideband family
    members that are present (above a threshold), and determine
    a family score based on which members are present, how many
    and the amplitude of each
    Calculate the candidate speed $RPS_{candidate}$ which would
    correspond to $f_{rpssbi}$ using the formula
    $RPS_{candidate} = LF - f_{rpssbi}$
    SAVE total energy content, family score and $RPS_{candidate}$
NEXT peak frequency $f_i$
RETURN

---

Finally, the following search routine, called from flowchart Box 242, searches the spectral data for a $SSDB_{fi}$ sideband family about each $RPS_{fi}$ sideband family about line frequency. These are the same peaks as were searched for by Search Routine I.A.3 called from Box 216:

---
SEARCH ROUTINE II.B.5 PSEUDOCODE
---

From the set of RPS sideband family peaks found in II.B.4,
FOR each peak frequency $f_i$
    where as seen in II.B.1
        $SSDB_{fi} = LF - f_i$
    FOR each $f_{rpssbi}$
        FOR sideband frequencies $(f_{rpssbi} \pm SSDB_{fi})$ and each of
        $(f_{rpssbi} \pm 2 \times SSDB_{fi})$, $(f_{rpssbi} \pm 3 \times SSDB_{fi})$,
        $(f_{rpssbi} \pm 4 \times SSDB_{fi})$ etc. possible sideband family
        members down through available spectral data
            SAVE frequency and amplitude
        NEXT possible sideband family member
    NEXT member of $f_{rpssbi}$ sideband family
    Calculate the total energy content of sideband family
    Determine the total energy of possible sideband family
    members that are present (above a threshold), and determine
    a family score based on which members are present, how many
    and the amplitude of each
    Calculate the candidate speed $RPS_{candidate}$ which would
    correspond to $f_i$
    SAVE total energy content, family score and $RPS_{andidate}$
NEXT peak frequency $f_i$
RETURN

---

In Box 244, the total energy content and the family score are determined for each candidate RPS, giving extra weight to candidate frequencies which are the closest to $RPS_{phs2}$, as well as those within a reasonable load range.

The routine exits at 246, with the speed having been determined as equal to the $RPS_{candidate}$ frequency having the highest score.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Apparatus for determining the rotational speed of an AC induction motor, supplied from an AC power source with a line frequency, having a predetermined number of poles, and having a synchronous speed which is two times the line frequency divided by the number of poles, said apparatus comprising:

a magnetic flux transducer for sensing magnetic flux generated by the motor during operation, producing magnetic flux signals; and a data processing system including:

a spectrum analyzer receiving signals from said magnetic flux transducer for generating a flux frequency spectrum having a set of peaks each characterized by a frequency and an amplitude, means for searching the flux frequency spectrum for a plurality of sets of particularly defined families of peaks, each set potentially including at least one family of peaks satisfying the particular family definition, having a family score and indicative of a possible rotational speed, and selecting for each set that includes at least one family the possible speed having the highest family score as a candidate speed, and means for determining whether there is a candidate speed with an overall score which exceeds a predetermined threshold and, if so, determining the motor rotational speed as that candidate speed.

2. Apparatus in accordance with claim 1, wherein one of the family definitions is motor rotational frequency and harmonics thereof.

3. Apparatus in accordance with claim 1, wherein one of the family definition is members of a sideband family of motor rotational frequency and harmonics thereof as sidebands about the line frequency.

4. Apparatus in accordance with claim 1, wherein one of the family definitions is members of a slip sideband family defined as a slip sideband and harmonics thereof as sidebands about a member of a sideband family of motor rotational frequency and harmonics thereof as sidebands about the line frequency, where the slip sideband is defined as the number of motor poles times slip frequency, and where slip frequency is the difference between motor synchronous speed and motor rotational speed.

5. Apparatus in accordance with claim 4, wherein the member of a sideband family of motor rotational frequency and harmonics thereof as sidebands about the line frequency is based on motor rotational frequency times an integer factor determined as one less than the number of motor pole pairs.

6. Apparatus in accordance with claim 2, wherein another one of the family definitions is members of a sideband family of motor rotational frequency and harmonics thereof as sidebands about the line frequency.

7. Apparatus in accordance with claim 2, wherein another one of the family definitions is members of a slip sideband family defined as a slip sideband and harmonics thereof as sidebands about a member of a sideband family of motor rotational frequency and harmonics thereof as sidebands about the line frequency, where the slip sideband is defined as the number of motor poles times slip frequency, and where slip frequency is the difference between motor synchronous speed and motor rotational speed.

8. Apparatus in accordance with claim 6, wherein yet another one of the family definitions is members of a slip sideband family defined as a slip sideband and harmonics thereof as sidebands about a member of the sideband family of motor rotational frequency and harmonics thereof as sidebands about the line frequency, where the slip sideband is defined as the number of motor poles times slip frequency, and where slip frequency is the difference between motor synchronous speed and motor rotational speed.

9. Apparatus in accordance with claim 3, wherein another one of the family definitions is members of a slip sideband family defined as a slip sideband and harmonics thereof as sidebands about a member of the sideband family of motor rotational frequency and harmonics thereof as sidebands about the line frequency, where the slip sideband is defined as the number of motor poles times slip frequency, and where slip frequency is the difference between motor synchronous speed and motor rotational speed.

10. Apparatus in accordance with claim 1, wherein said data processing system further includes means for identifying, in the event there is no candidate speed with an overall score which exceeds the predetermined threshold, up to a predetermined number of the largest peaks that occur in a frequency range near line frequency and, for each peak, considering the particular peak as indicative of a possible rotational speed and searching the flux frequency spectrum for another plurality of sets of particularly defined families of peaks, each of said another plurality of sets potentially including at least one family of peaks satisfying the particular family definition, and determining for each set a candidate rotational speed, a total energy content and a family score; and means for evaluating the total energy contents and family scores for all the family sets for each candidate rotational speed, and determining the rotational speed as the candidate rotational speed having the highest score.

11. Apparatus in accordance with claim 10, wherein one of the family definitions is a slip sideband defined as number of poles times slip frequency, and harmonics thereof.

12. Apparatus in accordance with claim 10, wherein one of the family definitions is a slip sideband defined as number of poles times slip frequency and harmonics thereof as sidebands about line frequency.

13. Apparatus in accordance with claim 10, wherein one of the family definitions is motor rotational frequency and harmonics thereof.

14. Apparatus in accordance with claim 10, wherein one of the family definition is members of a sideband family of motor rotational frequency and harmonics thereof as sidebands about the line frequency.

15. Apparatus in accordance with claim 10, wherein one of the family definitions is members of a slip sideband family defined as a slip sideband and harmonics thereof as sidebands about a member of a sideband family of motor rotational frequency and harmonics thereof as sidebands about the line frequency, where the slip sideband is defined as the number of motor poles times slip frequency, and where slip frequency is the difference between motor synchronous speed and motor rotational speed.

16. A method of determining the rotational speed of an AC induction motor, said motor producing leakage flux during operation, the method comprising the steps of:

producing magnetic flux signals representative of the magnetic flux generated by the motor;

generating a flux frequency spectrum from the magnetic flux signals, the spectrum having a set of peaks where each peak is characterized by a frequency and an amplitude;

searching the flux frequency spectrum for a plurality of sets of particularly defined families of peaks, each set potentially including at least one family of peaks satisfying the particular family definition, having a family score and indicative of a possible rotational speed;

selecting for each set that includes at least one family the possible speed having the highest family score as a candidate speed;

determining whether there is a candidate speed with an overall score which exceeds a predetermined threshold; and if a candidate speed is determined to have an overall score that exceeds the predetermined threshold, defining the motor rotational speed as that candidate speed.

17. The method in accordance with claim 16, further comprising the steps of:

if there is no candidate speed with an overall score which exceeds the predetermined threshold, identifying up to a predetermined number of the largest peaks present in a frequency range near line frequency;

considering each of said largest peaks as indicative of a possible rotational speed;

searching the flux frequency spectrum for another plurality of sets of particularly defined families of peaks, each of said another plurality of sets potentially including at least one family of peaks satisfying the particular family definition;

determining for each set a candidate rotational speed, a total energy content, and a family score;

evaluating the total energy contents and family scores for all the family sets for each candidate rotational speed; and determining the rotational speed as the candidate rotational speed having the highest score.

* * * * *